United States Patent [19]
Greene et al.

[11] Patent Number: 5,276,249
[45] Date of Patent: Jan. 4, 1994

[54] CATALYSTS FOR THE DESTRUCTION OF HALOGENATED ORGANICS

[75] Inventors: Howard L. Greene, Mogadore; Sougato Chatterjee, Akron, both of Ohio

[73] Assignee: The University of Akron, Akron, Ohio

[21] Appl. No.: 1,398

[22] Filed: Jan. 6, 1993

Related U.S. Application Data

[60] Division of Ser. No. 699,695, May 14, 1991, abandoned, which is a continuation-in-part of Ser. No. 523,017, May 14, 1990, abandoned.

[51] Int. Cl.$^5$ .......................... A62D 3/00; C01B 7/07
[52] U.S. Cl. .................................. 588/206; 588/207; 423/240 R; 423/659
[58] Field of Search ............... 423/659, 239, 240, 259; 502/79; 588/207, 206

[56] References Cited

U.S. PATENT DOCUMENTS

| | | | |
|---|---|---|---|
| 3,328,316 | 6/1967 | Mulaskey | 252/455 |
| 3,392,106 | 7/1968 | Mason et al. | 502/79 |
| 3,405,055 | 10/1968 | Bittner | 502/62 |
| 3,507,812 | 4/1970 | Smith et al. | 502/79 |
| 3,875,081 | 4/1975 | Young | 502/79 |
| 3,989,806 | 11/1976 | Hyatt | 423/502 |
| 3,989,807 | 11/1976 | Johnston | 423/502 |
| 4,148,759 | 4/1979 | Hilfman | 502/79 |
| 4,423,024 | 12/1983 | Wolford | 423/437 |

OTHER PUBLICATIONS

Chatterjee & Greene, "Oxidative Catalysis of Chlorinated Hydrocarbons by Metal-Loaded..." J. of Catalysis 1991 pp. 76-85.

*Primary Examiner*—Carl F. Dees
*Attorney, Agent, or Firm*—Oldham, Oldham & Wilson

[57] ABSTRACT

A new class of metal-exchanged, metal-impregnated zeolite catalysts has been prepared for the oxidation of halogenated organics including chlorinated, fluorinated and chloro/fluoro hydrocarbons. These catalysts are supported or unsupported, comprising from 0 weight percent, hereinafter wt.%, to about 95 wt. % of a binder, from about 10 wt. % to about 95 wt. % of a metal-exchanged zeolite, and from about 0.2 wt. % to about 12 wt. % of an impregnating metal compound, said percentage being calculated as the metal loading on an oxide basis, where the metal in the metal-exchanged zeolite can be selected from the representative and illustrative group consisting of V, Cr, Co, Ni, Cu, Fe, Mo, and Mn and the impregnating metal compound can be selected from the representative and illustrative group consisting of compounds of Ti, V, Cr, Mn, Fe, Co, Ni, Cu, Mo, Pd, and Pt. A process for making the catalysts and a process for the oxidation of the halogenated organics are disclosed which occur at relatively low temperatures, from about 100° C. to about 650° C., and at pressures near atmospheric and for residence times from about 0.01 seconds to about 20 seconds.

10 Claims, 6 Drawing Sheets

FIG.-2

TCE CONVERSION VS. TEMPERATURE PLOT WITH VARIOUS CATALYSTS

FIG.-4

CCl4 CONVERSION VS. TEMPERATURE PLOT WITH VARIOUS CATALYSTS

FIG.-5

MeCl2 CONVERSION VS. TEMPERATURE PLOT WITH VARIOUS CATALYSTS (MONOLITHS)

FIG.-6

CATALYSTS FOR THE DESTRUCTION OF HALOGENATED ORGANICS

This is a divisional of copending application Ser. No. 07/699,695 filed on May 14, 1991, now abandoned which is a continuation-in-part of Ser. No. 07/523,017 filed May 14, 1990, now abandoned.

TECHNICAL FIELD

This invention relates to metal-exchanged, metal-impregnated zeolite catalysts for the destruction of halogenated organics, said catalysts being supported or unsupported, optionally containing a binder, a process for making said catalysts and a process for the oxidative destruction of hazardous halogenated organics including chlorinated hydrocarbons, fluorinated hydrocarbons, and fluoro-chloro carbons (CFC's) which comprises burning the halogenated organics in the presence of said catalysts in an excess of oxygen or an oxygen containing gas mixture such as air.

BACKGROUND

Halogenated organics, including volatile and nonvolatile chlorinated, fluorinated and chloro-fluoro hydrocarbons, represent a considerable health and environmental risk. The destruction of these compounds normally requires high temperature oxidation in the presence of a supported catalyst such as chromium oxide supported on alumina or other types of supports. Hunter et al. in U.S. Pat. No. 4,330,513 has reported a process using a fluid bed reactor and chromium oxide catalyst impregnated on alumina for a process for burning catalytically chlorinated hydrocarbons including polychlorinated biphenyls (PCB). His apparatus requires a continuously fluidized bed of catalytic particles and is accomplished at a temperature range between 460° C.-745° C.

In U.S. Pat. No. 4,423,024 Wolford described the oxidation of saturated aliphatic chlorinated hydrocarbons to carbon dioxide and hydrogen chloride over a molecular sieve catalyst in the temperature range between about 180° C. to about 400° C. The catalyst was made of any type of molecular sieve type catalyst including such catalysts as zeolites and other shape selective or shape restricted catalytic compositions.

In U.S. Pat. No. 3,989,806, Hyatt teaches the use of a copper exchanged zeolite in a process to recover chlorine values from essentially perchlorinated hydrocarbons. This reaction involves the controlled oxidation of the chlorinated hydrocarbons in such a way as to optimize the recovery of chlorine gas. The invention was primarily geared toward the recovery of chlorine from the bottoms (high boiling by-products) produced during certain chlorination reactions.

In U.S. Pat. No. 3,989,807, Johnston described the use of chromium impregnated supports for a process to recover chlorine values from chlorinated organics especially perchlorinated organics. Like Hyatt, this process was geared toward recovering chlorine primarily from perchlorinated hydrocarbons in a temperature range from below 500° C. or typically below 450° C.

The above catalysts and processes involve either the use of exchanged zeolites for oxidation of chlorinated organics or the use of metal-exchanged zeolites or metal-impregnated zeolites for the recovery of chlorine from essentially perchlorinated hydrocarbons. Further, the above processes dealt mostly with fluidized reactors and fluidizable catalysts. Therefore, the catalysts were normally in the form of pure zeolite powders or finely divided particulates not suitable for fixed bed reactors.

Although zeolites (U.S. Pat. No. 4,423,024) were used to destroy chlorinated organics, exchanging the natural catalytic sites of a zeolite can so alter the catalytic behavior of the zeolite as to shut down reaction pathways that would have occurred without exchange. Thus, the mere fact that the unexchanged zeolite could be used to destroy chlorinated hydrocarbons, albeit less efficiently compared with the catalysts of the present invention, in no way suggests that exchanged zeolites would function analogously.

SUMMARY OF THE INVENTION

It is an object of this invention to provide a novel, low temperature, highly selective, highly active catalyst for the oxidative destruction of halogenated organics, said catalyst being supported or unsupported, and comprising a metal-exchanged and metal-impregnated zeolite, where the percent by weight compositions will be defined hereinafter, and optionally a binder.

A further object of this invention is to provide a process for manufacturing the catalyst of the present invention.

A still further object of this invention is to provide a process for the oxidative destruction of halogenated organics on the catalysts of the present invention in a temperature range from about 100° C. to about 650° C. and preferably from about 150° C. and 450° C.

Other aspects and objects of this invention will be explained and discussed in the following specification.

DETAILED DESCRIPTION

This invention relates to a metal-exchanged, metal-impregnated zeolite catalyst for the destruction of halogenated organics, said catalyst being supported or unsupported, comprising from 0 weight percent, hereinafter wt. %, to about 95 wt. % of a binder, from about 10 wt. % to about 95 wt. % of a metal-exchanged zeolite, and from about 0.2 wt. % to about 12 wt. % of an impregnating metal compound, said percentage being calculated as the metal loading on an oxide basis, where the metal in the metal-exchanged zeolite can be selected from the representative and illustrative group consisting of V, Cr, Co, Ni, Cu, Fe, Mo, and Mn and the impregnating metal compound can be selected from the representative and illustrative group consisting of compounds of Ti, V, Cr, Mn, Fe, Co, Ni, Cu, Mo, Pd, and Pt. Additionally disclosed is a process for making said catalysts and a process for the oxidative destruction of hazardous halogenated organics including chlorinated hydrocarbons, fluorinated hydrocarbons, and fluoro-chloro carbons (CFC's) which comprises burning the halogenated organics in the presence of said catalyst and the excess of oxygen or an oxygen containing gas mixture such as air.

More specifically, this invention relates to a metal-exchanged, metal-impregnated zeolite catalyst for the oxidative destruction of hazardous halogenated organics with oxygen or an oxygen containing gas mixture such as air, preferably in excess, the catalyst being supported or unsupported, which comprises from about 5 wt. % to about 25 wt. % of a binder, from about 63 wt. % to about 93 wt. % of a metal-exchanged zeolite, and from about 2 wt. % to about 12 wt. % of an impregnating metal compound.

More specifically, this invention relates to a metal-exchanged, metal-impregnated zeolite catalyst for the oxidative destruction of hazardous halogenated organics with oxygen or an oxygen containing gas mixture such as air, preferably in excess, the catalyst being supported or unsupported, which comprises from about 88 wt. % to about 98 wt. % of a metal-exchanged zeolite, and from about 2 wt. % to about 12 wt. % of an impregnating metal compound.

More specifically, this invention relates to a metal-exchanged, metal-impregnated zeolite catalyst for the oxidative destruction of hazardous halogenated organics with oxygen or an oxygen containing gas mixture such as air, preferably in excess, where the catalyst is washcoated onto a support, which comprises from about 30 wt. % to about 46 wt. % of a binder, from about 42 wt. % to about 68 wt. % of a metal-exchanged zeolite, and from about 2 wt. % to about 12 wt. % of an impregnating metal compound.

More specifically, this invention relates to a metal-exchanged zeolite, finely powdered impregnating compound catalyst for the oxidative destruction of hazardous halogenated organics with oxygen or an oxygen containing gas mixture such as air, preferably in excess, the catalyst being supported or unsupported, which comprises from about 5 wt. % to about 40 wt. % of a binder, from about 10 wt. % to about 80 wt. % of a metal-exchanged zeolite, and from about 2 wt. % to about 12 wt. % of an impregnating metal compound.

The binder, which need not be present, can be selected from the representative and illustrative group consisting of alumina, silica, alumina-silica, cordierite, titania, zirconia, vanadia, and other inorganic materials used as binding agents. However when present, binders such as Silbond ™ or other binders which form high surface area matrices are preferred. While not wishing to be bound by theory, it is believed that the binder, when present, will act as a bonding agent to secure the metal-exchanged zeolite onto the support, and also acts as a surface which will bond with the impregnating agent.

The metal in the metal-exchanged zeolite can be selected from the representative and illustrative group consisting of V, Cr, Co, Ni, Cu, Fe, Mo, and Mn. The impregnating metal compound can be selected from the representative and illustrative group consisting of compounds of Ti, V, Cr, Mn, Fe, Co, Ni, Cu, Mo, Pd, and Pt. Typically, the impregnating metal compound is a water soluble metal compound where the metal is available as an ion in any allowable oxidation state. When the catalyst is deposited on a support, the support can be made of any standard support material such as, but not restricted to, alumina, silica, silica-alumina, cordierite, titania, zirconia, other similar inorganic supports and extrudates containing zeolites. The support can be in any desirable shape including, but are not restricted to, honeycomb, monolith, pellets, rings, spheres, saddles, ceramic foams, extrudates, or other types of shaped support. Honeycombs and monoliths are preferred.

Catalyst Preparation

In a first embodiment of the invention, the metal-exchanged, metal-impregnated zeolite of the instant invention can be prepared by a process which comprises the steps of: (1) exchanging a zeolite with a metal to form a metal-exchanged zeolite; (2) drying the metal-exchanged zeolite; (3) calcining the metal-exchanged zeolite, (4) optionally adding a binder to the metal-exchanged zeolite; (5) drying the metal-exchanged zeolite/binder combination, if the binder is present; (6) calcining the metal-exchanged zeolite/binder combination, if the binder is present; (7) impregnating the metal-exchanged zeolite to form a metal-exchanged zeolite, metal-impregnated catalyst; (8) drying the metal-exchanged, metal-impregnated catalyst; and (9) calcining the metal-impregnated, metal-exchanged zeolite catalyst to form an active catalyst for the destruction of halogenated organics.

In a second embodiment of the invention, the metal-exchanged, metal-impregnated zeolite of the instant invention can be prepared by a process which comprises the steps of: (1) exchanging a zeolite with a metal to form a metal-exchanged zeolite; (2) drying the metal-exchanged zeolite; (3) calcining the metal-exchanged zeolite, (4) washcoating the metal-exchanged zeolite catalyst onto an inorganic support with or without a binder; (5) drying the washcoated metal-exchanged zeolite/support combination; (6) calcining the washcoated metal-exchanged zeolite/support combination; (7) impregnating the metal-exchanged washcoated zeolite/support to form a metal-exchanged zeolite, metal-impregnated catalyst; (8) drying the metal-exchanged, metal-impregnated catalyst; and (9) calcining the metal-impregnated, metal-exchanged zeolite catalyst to form an active catalyst for the destruction of halogenated organics.

In a third embodiment of the invention, the metal-exchanged, metal-impregnated zeolite of the instant invention can be prepared by a process which comprises the steps of: (1) exchanging a zeolite with a metal to form a metal-exchanged zeolite; (2) drying the metal-exchanged zeolite; (3) calcining the metal-exchanged zeolite, (4) dry-mixing the metal-exchanged zeolite powder with a finely powdered impregnating metal compound, (5) adding a binder to form a metal-exchanged zeolite, finely powdered impregnating metal compound powder/binder slurry, (6) drying the metal-exchanged zeolite, finely powdered impregnating metal compound/binder slurry; and (7) calcining the metal-exchanged zeolite, finely powdered impregnating metal compound catalyst to form an active catalyst for the destruction of halogenated organics.

Zeolitic Catalyst Metal-Ion Exchange Process

Exchanging a zeolite with a metal, which is typically a water soluble metal salt with the metal available as an ion, to form a metal-exchanged zeolite, normally involves first treating the zeolite with ammonia in an aqueous environment to convert protonic sites to ammonium sites; the ammonium sites facilitating the metal exchange reaction. Normally, water soluble metal salts are used in the exchange reaction because the exchange reaction involves the replacement or exchange of one ion for another ion in the channels or cages of the zeolite. The exchange process is normally carried out until exchange equilibrium is attained which can range from about six hours to about 24 hours or more, with 10 to 20 hours being preferred.

Metal-Exchanged Zeolite Catalyst Washcoating

Washcoating is a technique for surface deposition of an active catalyst species onto the surface of an inert support. The coating technique is normally performed by dipping a support in a slurry of the active catalyst and optionally a binder. The binder, when necessary, allows efficient adherence of the catalytic agent to the support surface. Drying and calcining completes the washcoat bonding process resulting in a surface coated support. Of course, it should be recognized that the coverage of the surface will not be complete, and second, that pores formed by the binder can expose zeolite or support.

The amount of the catalytic composition, washcoated or otherwise bonded to the surface of a given support, will depend in a large part on the end use of the particular supported catalysts. However, typically, the catalyst composition does not make up more than 50% of the weight of the final catalyst, i.e., 50% catalyst and 50% support. Preferably, the catalyst compositions make up no more than 25% of the combined weight. However, supported catalysts can be made where the catalyst composition makes up more than 50% of the weight or less than 25% of the weight.

Metal-Ion Exchanged Zeolite Catalyst Impregnation

Impregnation is a technique where a surface is saturated with a metal ion. The impregnating metal compound can be selected from the representative and illustrative group consisting of compounds of Ti, V, Cr, Mn, Fe, Co, Ni, Cu, Mo, Pd, and Pt. Typically the impregnating metal compound can be any reagent containing the desired metal in a usable form, such as, but not restricted to, water soluble salts of these metals where the metal ion is in any chemically allowable oxidation state. The impregnation involves immersion or soaking of the washcoated catalyst in a solution containing the impregnating metal compound, and optionally a binder. The impregnated catalyst is then subjected to a drying and a calcining step. The impregnation step is normally performed in an aqueous medium which requires the impregnating metal compound to be water soluble to some extent. Previously exchanged metal ions are neither lost nor are they replaced during this impregnation process. Furthermore, impregnation sites yield very different catalytic properties from metal-exchanged sites as is subsequently demonstrated by results shown in FIG. 1. Comparing the curves for that of a metal-exchanged zeolite, curves for Co-Y, Mn-Y, and Cr-Y, with those for Co-Y/CA, Mn-Y/CA, and Cr-Y/CA, quickly points out these differences.

Metal-Exchanged Metal-Impregnated Zeolitic Catalyst Drying

The drying steps are well known drying and are typically performed at a temperature sufficient to promote drying and for a time sufficient to attain drying at a given temperature. Of course, there is an inverse relationship between temperature of drying and time of drying, i.e., as the temperature goes up the time of drying goes down. However, too rapid a drying rate can adversely affect ultimate catalyst properties. Thus, the time and temperature of drying are typically balanced to give the best overall properties. In the present invention, the drying time is usually from about 2 hours to about 48 hours or longer and the drying temperature is usually from about 95° C. to about 250° C. The dried catalyst is then calcined at a temperature from about 400° C. to about 750° C. for a time sufficient to render the catalyst in a stable form from about 2 hours to about 48 hours or longer. Since zeolites are involved, temperatures much above 750° C. may cause destruction of the crystalline nature of the zeolite. The thermal destruction of synthetic zeolite is well known in the art.

Non-Supported Catalysts

There are several methods which can be employed to prepare non-supported metal-exchanged, metal-impregnated catalysts. In one embodiment, commercially available zeolite pellets are exchanged with appropriate metal ions. Subsequent to appropriate drying and calcining, these metal-ion exchanged zeolite pellets, are impregnated with a suitable impregnating agent, and optionally with a binder. After appropriate drying and calcination steps, followed by sieving to appropriate screen size, a non-supported catalyst has been prepared.

In a second embodiment, commercially available zeolite powders are exchanged with appropriate metal ions. Subsequent to appropriate drying and calcining, these metal-ion exchanged zeolite powders, are dry-mixed with a suitable finely powdered impregnating metal compound and slurried with a binder. After appropriate drying and calcination steps, followed by sieving to appropriate screen size, a non-supported catalyst has been prepared.

In a third embodiment, non-supported catalysts can also be prepared by simply taking the catalytic mixture (metal-impregnated and metal-exchanged zeolite) and shaping the mixture into a form in a wetted state (inclusion of sufficient water to render the mixture formable, i.e., not too fluid or not too dry, as is well known in the art), and drying and calcining the form. This process results in a stable, unsupported catalyst. This method may also require the inclusion of extrusion aids such as inorganic or organic plasticizers well known in the art or pore forming additives also well known in the art.

In yet a fourth embodiment, non-supported catalysts can be prepared by a method which involves the preparation of a ceramic foam, comprising a mixture of the metal-impregnated and the metal-exchanged zeolite. Thus, the above mixture is sprayed or otherwise coated onto an organic form. The coated form is dried and then calcined, which destroys the organic form, leaving behind a ceramic remnant of the organic form, i.e., a ceramic foam. It should be recognized that other techniques well known in the art can also be used to form the unsupported catalyst of the present invention.

Ion Exchange/Impregnation Reagents

The specific type of metal reagents which can be used for either exchanging the zeolite or for impregnating the catalysts include, but are not restricted to, chlorides including all possible chlorides of each metal, oxides, phosphates, sulfates, acetates, formates, nitrates, bromides, carbonates, hydroxides, and other similar water soluble salts of metals selected from the representative and illustrative group consisting of Ti, V, Cr, Mn, Co, Ni, Cu, Fe, Mo, Mn, Pd and Pt. However, it should be recognized that non-aqueous methods can also be employed to exchange the zeolite or impregnate the washcoated support.

Zeolites

The zeolites usable in this invention include pellets and powders, such as Na-Y and H-Y, and are commercially available from Union Carbide, Linde Division, under the tradename Y-52, and Y-82 respectively. However Y-zeolites from any other manufacturer can be utilized under similar conditions, along with other types of zeolites, such as A, L, O, P or X zeolites, silicalites, ZSM series, or naturally occurring zeolites such as faujasites or mordenites.

Supports

A variety of supports can be used as substrates for the catalysts of the present invention. The supports include, but are not restricted to, typical inorganic supports such as alumina, aluminum oxide, silica, silicates, silicaaluminas, aluminum-silicates, titanias, cordierite and other similar supports and combinations thereof. These inorganic supports can be in any number of shapes and structures depending on the exact requirements of the reactor or process in which they will be incorporated. In one embodiment of the invention, a preferred support shape is the honeycombed type shape. Each honeycomb pattern selected is again a matter of discretion depending to a large extent on the reactor and process variables. Other shaped forms are also usable including, but not restricted to, spheres, Intalox TM saddles, Super Intalox TM saddles, Berl saddles, slotted ring Tower Packing TM, Raschig Rings TM, cross-partition rings, Lessing rings, balls, pellets, bricks, ceramic foams and monoliths. It has also been possible to use metals, such as stainless steel as a support material.

Process Conditions

The process for the oxidation of halogenated organics involves contacting the halogenated organics with a catalyst of the present invention in the presence of oxygen or an oxygen containing gas mixture, preferably in excess, at a temperature from about 100° C. to about 650° C., preferably from about 150° C. to about 450° C., for a time sufficient to fully oxidize the halogenated organics. The time can range from about 0.01 seconds to about 20 seconds, but preferably from about 0.2 to 1.0 seconds. The oxidation is also preferably carried out in the presence of water vapor. The presence of water vapor aids in the oxidation reaction suppressing the formation of halogen gas. The advantage of water vapor also makes destruction of waste organics more amenable to industrial applications where water is normally associated with the waste organics.

The destruction of these halogenated organics can occur in the presence of excess oxygen or in an oxygen containing gas including compressed air, compressed oxygen or mixtures thereof. The reaction can be carried out at oxygen ratios near stoichiometry to excesses between 25% and 50% or more. When air-stripping chlorinated contaminants from ground water, the reaction is carried out at an oxygen ratio approximating an excess of 1200%.

Reactants

The types of halogenated organics for which the novel catalysts of this invention are able to oxidize include, but are not restricted to, the following: chlorinated hydrocarbons such as chlorinated methanes including chloromethane, dichloromethane, chloroform, carbon tetrachloride; chlorinated ethane including chloroethane, dichloroethane, trichloroethane, tetrachloroethane and higher chlorinated ethanes; other chlorinated alkanes; chlorinated ethylenes including monochloroethylene, dichloroethylene, trichloroethylene, and tetrachloroethylene; chlorinated propylene and other chlorinated alkenes and dienes; chlorinated aromatics including chlorinated benzenes; perchlorinated hydrocarbons including hexachlorobenzene, hexachlorobutadiene, hexachloroethane, chlorinated styrenes, dioxin, polychlorinated biphenyls, and other chlorinated hydrocarbons and organics; fluorinated hydrocarbons from gaseous to high molecular weight ones, such as fluorinated methanes including fluoromethane, difluoromethane, fluoroform, carbon tetrafluoride; fluorinated ethylene, 1-fluoroethylene, difluoroethylene, tri and tetra fluoroethylene; chlorinated/fluorinated hydrocarbons such as ferons including difluoro-dichloro-ethane, fluorochloro propanes, CFC-12, CFC-11, CFC-113 and other similar CFC's.

DETAILED DESCRIPTION

Applicants have found that metal-exchanged, metal-impregnated zeolites give rise to unique, highly active, very selective catalysts for the oxidative destruction of halogenated organics to the halo acid and carbon oxides (carbon monoxide and carbon dioxide). It is believed that these catalysts are novel in that they combine the cracking and oxidation capability of a metal-exchanged zeolite, wherein the first catalytic site in the composition is in a channel or a cage of the zeolite, with the deep oxidation potential of a transition metal oxide, wherein the second catalytic site in the composition is on a surface of the combination. While not wishing to be tied to any theory, it is believed that this combination of first and second site interaction leads to highly active, very selective catalysts for the complete oxidative destruction of halogenated organics to the halo acid and carbon oxides.

Simultaneously, this invention produces a catalyst resistant to deactivation, common to pure zeolites, as caused by deposition of carbon in the catalyst channels and pores. Instead, the carbon is oxidized primarily to $CO_2$ and CO.

In preparing catalysts of the invention, the metal ions used in the zeolitic ion-exchange are selected from the representative and illustrative group consisting of V, Cr, Co, Ni, Cu, Fe, Mo, and Mn. This catalyst is subsequently impregnated with a metal compound where the metal ions used in the metal impregnation are selected from the representative and illustrative group consisting of compounds of Ti, V, Cr, Mn, Fe, Co, Ni, Cu, Mo, Pd, and Pt. These catalysts show considerable activity at moderate temperatures typically in the range between approximately 100° C. to 650° C. and in a particularly preferred range of approximately 150° C. to about 450° C.

The catalysts are active enough to oxidize the halogenated organic feeds coming into it in very short periods of time, ranging from approximately 0.01 second to approximately 20 seconds. This metal-exchanged, metal-impregnated catalyst shows marked increases in both reactivity and selectivity over its non-impregnated analog, which only has metal catalytic sites available in the channels and cages of the zeolite.

The metal-exchanged, metal-impregnated zeolite catalyst is typically prepared by first ammonium exchanging the zeolite, followed by the exchange of the ammonium group with the active metal agent. However, zeolites that have already been ammonium exchanged can be used directly without prior ammonium treatment. Non-ammonium exchanged zeolites can also be used, but the exchange reaction does not proceed as well. In the present invention, when a chromium-exchanged zeolite is desired, the preferred chromium exchange salt is chromic nitrate. However, other water soluble chromium salts can be used to affect the exchange. The use of an ammonium exchanged zeolite, where the protonic acid sites of the original zeolites have been exchanged or reacted by ammonium, provides a more efficient procedure for the exchange of an active zeolite site within the zeolitic channel and cages by the chromium ions. This same technique works equally well with soluble salts of V, Co, Ni, Cu, Fe, Mo, and Mn. The metal-exchanged zeolite is then dried and calcined under conditions to attain a stable and active zeolite. Zeolites can be destroyed by calcining either at too high of a temperature or at a temperature close to the zeolite destruction temperature for too long a time during calcining.

In one embodiment, the metal-exchanged zeolite is then washcoated onto an inorganic support which has been etched to facilitate the binding. However, etching is not mandatory and is used only to improve binding. The washcoating is optionally performed in the presence of an inorganic binder such as Silbond-H-5 TM. However, alumina binders are preferred when fluorinated organics are a part of the waste product composition that is to be oxidized in the presence of the catalysts described herein. This requirement is probably due to the volatility of $SiF_4$ formed during oxidation of fluorocarbons in the presence of silica. Alumina is not susceptible to the formation of volatile fluorides. The silica or alumina binder, if necessary, is used to aid in binding the zeolite to the surface of the inorganic support which is effectuated by a calcination step which allows the binder to bond the zeolite to the surface of the inorganic support producing a zeolite coated support.

Washcoating binders also produce pores on the surface of the support. The pores can expose zeolite or support surfaces. The optional binder, by producing pores on the surface of the support, also typically increases the surface area of the resulting catalytic composition. Although the invention describes a single washcoating, multiple washcoatings can be used as well. Repeating the washcoating process simply increases the amount of active zeolite on the surface. However, it should be recognized that any type of support commonly used in the art would be suitable for the present application as well as binders commonly known in the art.

The washcoated inorganic support or preformed binder/zeolite catalyst is impregnated with an impregnating metal compound, where the metal in the metal-exchanged zeolite can be selected from the representative and illustrative group consisting of V, Cr, Co, Ni, Cu, Fe, Mo, and Mn and the impregnating metal compound can be selected from the representative and illustrative group consisting of compounds of Ti, V, Cr, Mn, Fe, Co, Ni, Cu, Mo, Pd, and Pt. The amount of impregnating metal compound can range from about 0.2 wt. % to about 12 wt. %, preferably from about 2 wt. % to about 12 wt. % based on the combined weight of the catalyst composition which does not include the weight of the support.

The impregnation uses a soluble metal compound to effect an aqueous impregnation of the washcoated support. The impregnating metal compound is allowed to impregnate the surface of the zeolite and if present, the surface of the binding agent to form metal sites other than the zeolitic channel and cage metal sites. It is thought that the combination of these two different types of metal sites is responsible for the significantly increased reactivity and selectivity of this catalyst. The ability to make the metal in the zeolite different from the metal impregnated into the zeolite surface allows considerable flexibility in making and utilizing these catalysts. This ability also allows for the design of catalyst more specifically tailored to destroy different classes of organic wastes.

In the case of chromium impregnation, the preferred compound is chromic acid. As in the case of washcoating, drying and calcining are required to bond the impregnating metal compound on the catalytic surface and render stable active catalytic sites. Multiple impregnations are also obvious extensions of the present teaching and is a simple technique for increasing the amount of secondary catalytic sites on the zeolite surface.

In a second embodiment, the metal-exchanged zeolite is optionally slurried into an inorganic binder such as Silbond-H-5 TM to facilitate the impregnating metal binding. However, alumina binders are preferred when fluorinated organics are a part of the waste product composition that is to be oxidized in the presence of the catalysts described herein. This requirement is probably due to the volatility of $SiF_4$ formed during oxidation of fluorocarbons in the presence of silica. Alumina is not susceptible to the formation of volatile fluorides. The silica or alumina binder, if necessary, is used to aid in binding the impregnating metal to the surface of the inorganic support which is effectuated by a drying/calcination step which allows the binder to adhere to the zeolite. Binders also produce pores on the surface. Producing pores on the surface of the support, also typically increases the surface area of the resulting catalytic composition.

The metal-exchanged zeolite and optional binder is impregnated with an impregnating metal compound, where the metal in the metal-exchanged zeolite can be selected from the representative and illustrative group consisting of V, Cr, Co, Ni, Cu, Fe, Mo, and Mn and the impregnating metal compound can be selected from the representative and illustrative group consisting of compounds of Ti, V, Cr, Mn, Fe, Co, Ni, Cu, Mo, Pd, and Pt. The amount of impregnating metal compound can range from about 0.2 wt. % to about 12 wt. %, preferably from about 2 wt. % to about 12 wt. % based on the combined weight of the catalyst composition which does not include the weight of the support.

The impregnation uses a soluble metal compound to effect an aqueous impregnation of the washcoated support. The impregnating metal compound is allowed to impregnate the surface of the zeolite and if present, the surface of the binding agent to form metal sites other than the zeolitic channel and cage metal sites. It is thought that the combination of these two different types of metal sites is responsible for the significantly increased reactivity and selectivity of this catalyst. The ability to make the metal in the zeolite different from the metal impregnated into the zeolite surface allows considerable flexibility in making and utilizing these catalysts. This ability also allows for the design of catalyst more specifically tailored to destroy different classes of organic wastes.

In a third embodiment, the metal-exchanged zeolite is dry-mixed with a finely divided metal impregnating compound and slurried into an inorganic binder such as Silbond-H-5 TM to facilitate the zeolite/impregnating metal compound binding. However, alumina binders are preferred when fluorinated organics are a part of the waste product composition that is to be oxidized in the presence of the catalysts described herein. This requirement is probably due to the volatility of $SiF_4$ formed during oxidation of fluorocarbons in the presence of silica. Alumina is not susceptible to the formation of volatile fluorides. The silica or alumina binder, if necessary, is used to aid in binding the impregnating metal to the surface of the inorganic support which is effectuated by a drying/calcination step which allows the binder to adhere to the zeolite. Binders also produce pores on the surface. Producing pores on the surface of the support, also typically increases the surface area of the resulting catalytic composition.

The metal-exchanged metal-impregnated zeolite catalyst is such that the metal in the metal-exchanged zeolite can be selected from the representative and illustrative group consisting of V, Cr, Co, Ni, Cu, Fe, Mo, and Mn and the impregnating metal compound can be selected from the representative and illustrative group consisting of compounds of Ti, V, Cr, Mn, Fe, Co, Ni, Cu, Mo, Pd, and Pt. The amount of impregnating metal compound can range from about 0.2 wt. % to about 12 wt. %, preferably from about 2 wt. % to about 12 wt. % based on the combined weight of the catalyst composition which does not include the weight of the support.

The impregnation uses a metal compound which has some degree of solubility in the inorganic binder, such as Silbond-H-5 TM, to effect an aqueous impregnation of the washcoated support. The impregnating metal compound is allowed to impregnate the surface of the zeolite and the surface of the binding agent to form metal sites other than the zeolitic channel and cage metal sites. It is thought that the combination of these two different types of metal sites is responsible for the significantly increased reactivity and selectivity of this catalyst. The ability to make the metal in the zeolite different from the metal impregnated into the zeolite surface allows considerable flexibility in making and utilizing these catalysts. This ability also allows for the design of catalyst more specifically tailored to destroy different classes of organic wastes.

It should be appreciated that there are at least 15 different combinations of metals which are possible for catalysts having one metal-exchanged in the zeolite and a second, the same or different, impregnated on the surface. It should also be appreciated that trimetallic compositions are also possible by either using two different metals during exchange or during impregnation. Four metal and higher mixed metal combinations are also possible.

Applicants have also found that the addition of water to the feed stream in an amount below the supersaturation point at the given temperature and pressure of the feed stream, is capable of effectively shifting the equilibrium concentration of chlorine gas produced during oxidation to hydrochloric acid according to the Deacon reaction shown below:

$$4 HCl + O_2 \rightleftharpoons 2 H_2O + 2 Cl_2$$

The invention will be made more clear by reference to an illustrative group of examples which describe the preparation of the catalyst and describe the types of results which are common in the use of these catalysts for the destruction of halogenated organics. All parts and percentages are by weight unless otherwise indicated.

In the examples below, the following abbreviations will be used:

| | |
|---|---|
| CA | chromic acid |
| TCE | trichloroethylene |
| MeCl$_2$ | methylene chloride |
| Cr-Y | chromium exchanged Y type zeolite |
| Cu-Y | copper exchanged Y type zeolite |
| Co-Y | cobalt exchanged Y type zeolite |
| NA | no available results |

EXAMPLE 1

This example describes the preconditioning of the inorganic support. This step is optional and is presented here only to indicate the manner in which the catalyst was prepared in full.

A three-inch cordierite core was leached in a 1.5N aqueous HNO$_3$ solution at 95° C. for about two and a half hours, followed by washing with distilled water for 10 minutes at 95° C. This resulted in a core with a weight loss in the vicinity of 2-6%. The leached core was dried in an oven at 100° C. for 10-16 hours.

It should be recognized that any other similar inorganic support including the ones previously listed can be substituted for the cordierite core.

EXAMPLE 2

This example describes the preparation of a chromium-exchanged zeolite.

89.77 grams of NH$_4$Cl were dissolved in 445 ml of distilled water. 74.5 grams of Linde Y-82 (sometimes herein referred to as H-Y) molecular sieve powder was slurried in this solution. The slurry was heated to about 100° C. and an even mixing was accomplished by stirring it for two hours. The exchanged zeolite powder was filtered while hot and washed with distilled deionized water during filtration. This preliminary process results in an ammonium-exchanged zeolite powder. The ammonium-exchanged zeolite powder was slurried in approximately twice its weight of distilled deionized water (150 ml). Six weight percent of Cr(NO$_3$)$_3$, based on the weight of zeolite powder, was dissolved in approximately 300 times its weight of distilled deionized water. The dilute solution of the exchanging salt Cr(NO$_3$)$_3$, was added to the zeolite slurry and the resulting mixture was continuously stirred. In order to establish an exchange equilibrium, the stirring was continued over a period of 12-15 hours. After the required time period, the slurry was filtered and washed with distilled deionized water to remove all traces of soluble salts. The filtered zeolite powder was dried at 125° C. for two hours and then calcined at 550° C. over a period of 10-12 hours. The resulting zeolite aggregate was crushed to a fine powder and used for washcoated catalyst preparation. Although this example involves Cr exchange, the exact procedure can be used for the other metals taught herein. The only difference would be in the replacement of Cr(NO$_3$)$_3$ with a similar salt of either V, Co, Ni, Cu, Fe, Mo, and Mn.

It should be recognized that the same technique as described above can be performed with any other inorganic support.

EXAMPLE 3

This example describes the washcoating procedure for depositing the chromium exchanged zeolite onto an inorganic support.

Approximately 25% by weight, based on the amount of binder of the exchanged zeolite of Example 2, was slurried in 200 ml of Silbond-H-5 TM. The slurry was kept well mixed by continuous stirring. The weighed cordierite core, as prepared in Example 1, was dipped into the slurry and taken out. The cordierite channels were then partially cleared by blowing compressed air through them. The above procedure was repeated four times. Finally, the core was dried at 200° C. for two hours followed by calcination at 550° C. for 12-14 hours. Generally the core showed a weight gain of between 15% and 20% after the washcoating procedure.

It should be recognized that this same procedure may be repeated any number of times to increase the loading of the catalyst onto the inorganic support.

EXAMPLE 4

This example describes the preparation of a CA-impregnated catalyst of Example 3.

Approximately 6% salt solution was prepared by dissolving 20 grams of chromium oxide ($CrO_3$) in 300 ml of distilled deionized water. The catalyst as prepared in Example 3, was immersed into the chromic acid ($H_2CrO_4$) solution and kept there for about two hours. Thereafter, the catalyst core was removed and dried at 200° C. for two hours. It was then calcined at 550° C. for 10-12 hours.

Although this example involves chromium impregnation, this procedure can be used for any of the other metals taught herein. The only difference would be in the replacement of chromic acid with a suitable water soluble or partially soluble salt of either Ti, V, Co, Ni, Cu, Fe, Mo, Mn, Pd and Pt.

It should be recognized that this same procedure may be repeated any number of times to increase the loading of the catalyst onto the inorganic support.

EXAMPLE 5

This example describes the procedure for preparing unsupported binderless CA-impregnated Co-Y catalyst pellets.

1/16" LZ-Y62 extrudates/pellets were obtained from Union Carbide Co. 100 grams of the Y-62 pellets were ammonium exchanged as per Example 2. The ammonium-exchanged zeolite pellets were slurried in approximately twice their weight of distilled deionized water (120 ml). 16 grams of $Co(NO_3)_2 \cdot 6H_2O$, based on 3.25 grams of Co per 100 grams of zeolite, was dissolved in approximately 300 times its weight of distilled deionized water. The dilute solution of the exchanging salt $Co(NO_3)_2$, was added to the zeolite slurry and the resulting mixture was continuously stirred at about 40°-50° C. In order to establish an exchange equilibrium, this stirring was continued over a period of 2-3 days. After the required time, the exchange solution was drained and the zeolite pellets were then dried at 125° C. for 2 hours followed by calcination at 550° C. over a period of 10-12 hours. This resulted in approximately 1.5-2.5 wt. % metal loading on an oxide basis. Although this example involves Co exchange, the exact procedure can be used for the other metals taught herein. The only difference would be the replacement of $Co(NO_3)_2$ by the suitable salt of the metal used.

Following the Co exchange, the Co-Y pellets were CA-impregnated by slurrying them in a 13 wt % solution of $CrO_3$ in water. The Co-Y pellets were immersed into the chromic acid solution at about 25° C. and kept there for 3-4 hours. Thereafter the catalyst pellets were removed and dried at 200° C. for two hours. They were then calcined at 550° C. for 10-12 hours. The same procedure can be used to impregnate the exchanged zeolites with any other metals taught herein.

EXAMPLE 6

This example describes the procedure for preparing unsupported CA-impregnated Co-Y catalysts from zeolite powder and a silica binder.

Co-Y was prepared by Co exchanging LZ-Y82 zeolite powder as in Examples 2 and 5. Approximately 25% by weight, based on the amount of silica binder, was slurried in 68 ml of Silbond-H-5 TM. The slurry was well mixed by continuous stirring and heated to 40° C. for about 1 hour. After the required time period, the volatile part of the Silbond-H-5 TM evaporated and the slurry became a thick paste. This zeolite/binder paste was dried at 200° C. for 2 hours followed by calcining at 550° C. for 10-12 hours. After calcining, the Co-Y/Silbond aggregate was crushed and sieved to 3/64" pellets.

These pellets were further CA-impregnated from a 13 wt % $CrO_3$ solution in water as described in Example 5. Even though CA impregnation was carried out in this case, any other suitable metal salts can also be used to do the metal impregnation step.

EXAMPLE 7

This example describes the procedure for preparing a supported or unsupported Co-Y catalysts/finely divided impregnating metal compound catalysts from zeolite powder, finely powdered impregnating metal compound and a silica binder.

Co-Y was prepared by Co exchanging LZ-Y82 zeolite powder as in Examples 2 and 5. Approximately 9.0 grams of Co-Y zeolite powder was dry-mixed with 0.55 grams of $Cr_2O_3$. After a suitable period of time, 15.0 grams of Silbond-H-5 TM was added to the mixed powder to form a slurry. The slurry was well mixed by continuous stirring and heated to 40° C. for about 1 hour. After the required time period, the volatile part of the Silbond-H-5 TM evaporated and the slurry became a thick paste. This metal-exchanged zeolite/finely powdered impregnating metal compound/binder paste was dried at 200° C. for 2 hours followed by calcining at 550° C. for 10-12 hours.

After calcining, the Co-Y/$Cr_2O_3$/Silbond aggregate was crushed and sieved to 3/64" pellets. Even though $Cr_2O_3$ was used in this case, any other suitable metal salts can be used for the dry mixing step.

DISCUSSION

The importance of inter-site catalytic interaction is demonstrated by a comparison of a series of reaction runs using a catalyst as described in Example 4 for the destruction of trichloroethylene (TCE) to comparable data using a series of reaction runs using a catalyst as described in Example 3. The feed ratios as stated in the previous example are modified by the amount of water added to the feed.

The results of these runs are indicated in Tables 1 and 2 below.

TABLE 1

Results of the oxidation of trichloroethylene using catalyst of Example 4.

| Feed Ratio | Feed Conc. (ppm) | Temp. (°C.) | Water (ppm) | Conv. (%) | Cl Balance | C Balance |
|---|---|---|---|---|---|---|
| 0.08 | 751 | 400 | 13271 | 92.8 | 113.2 | 63.6 |

TABLE 1-continued

Results of the oxidation of trichloroethylene using catalyst of Example 4.

| Feed Ratio | Feed Conc. (ppm) | Temp. (°C.) | Water (ppm) | Conv. (%) | Cl Balance | C Balance |
|---|---|---|---|---|---|---|
| 0.11 | 1073 | 375 | 12044 | 90.4 | 91.1 | 46.1 |
| 0.13 | 1176 | 350 | 11679 | 92.8 | 86.7 | 42.2 |
| 0.16 | 1344 | 300 | 10262 | 89.8 | 70.0 | 32.3 |

TABLE 2

Results of the oxidation of trichloroethylene using catalyst of Example 3.

| Feed Ratio | Feed Conc. (ppm) | Temp. (°C.) | Water (ppm) | Conv. (%) | Cl Balance | C Balance |
|---|---|---|---|---|---|---|
| 0.09 | 851 | 250 | 12047 | 2.7 | 104.4 | 104.6 |
| 0.10 | 835 | 300 | 10653 | 11.5 | 105.6 | 103.2 |
| 0.12 | 1004 | 350 | 10918 | 36.1 | 98.2 | 96.6 |
| 0.11 | 989 | 400 | 11728 | 67.4 | 104.6 | 96.3 |
| 0.10 | 949 | 450 | 13454 | 87.9 | 102.3 | 83.7 |

Figure 1:
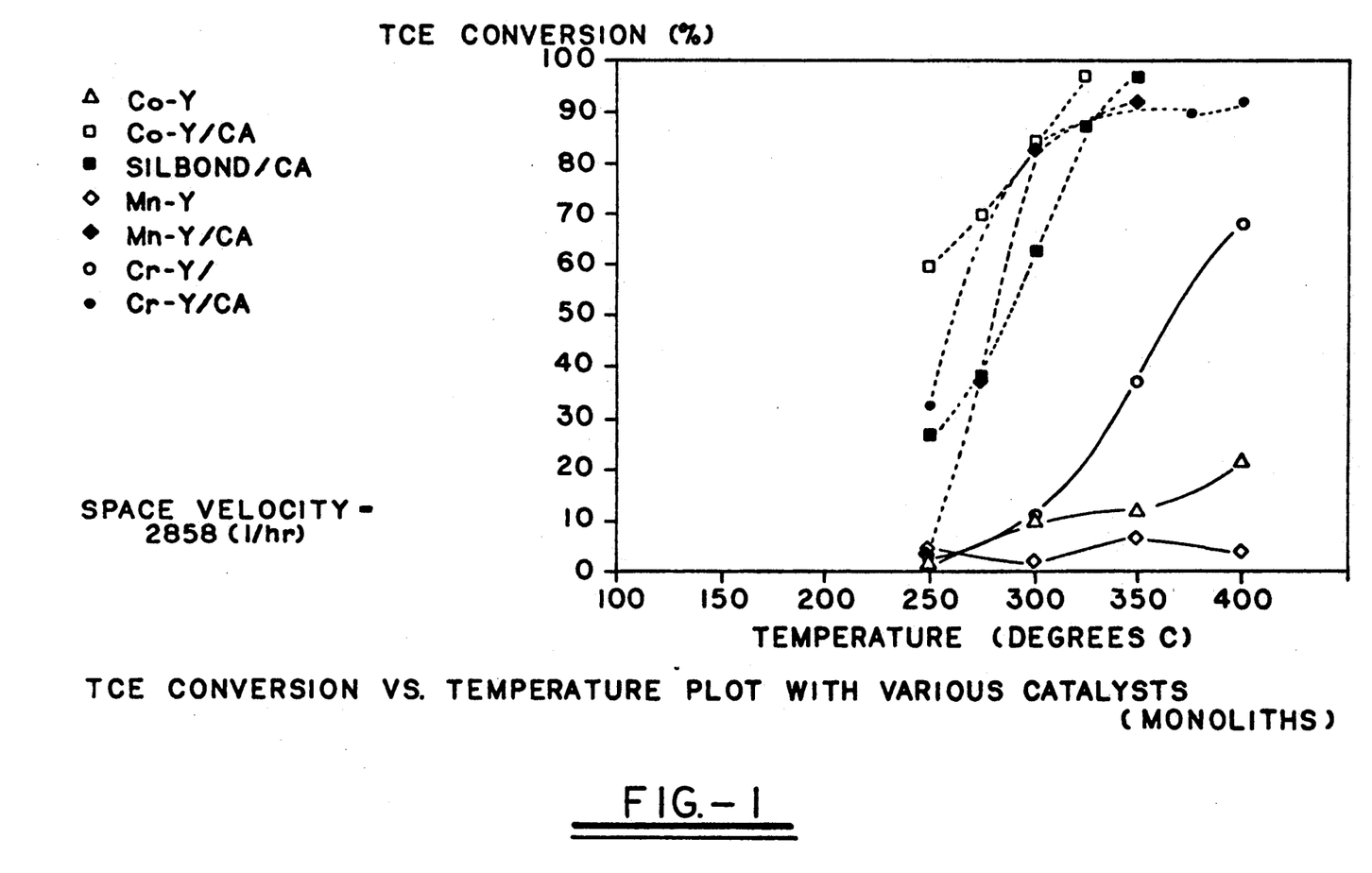
FIGS. 1 to 6 describe a series of reactor runs using catalysts of Examples 4-6 and various volatile chlorinated hydrocarbon feeds.

The data presented in this table show that the additional impregnated chromium sites of a catalyst prepared according to Example 4, greatly increase the catalytic activity at lower temperature. Thus, the catalytic activity of a catalyst according to Example 3, as shown in Table 2, exhibited only an 87.9% conversion at 450° C. while the catalyst according to Example 4, showed an 89.8% conversion at only 300° C. with nearly the same feed ratios. Additional evidence for this phenomena is illustrated in FIG. 1. Comparing the curves for that of a metal-exchanged zeolite, curves for Co-Y, Mn-Y, and Cr-Y, with those for Co-Y/CA, Mn-Y/CA, and Cr-Y/CA, quickly points out essential differences in catalytic activity by the addition of chromic acid.

It is apparent from the above data that the catalyst conditions can be selected to obtain nearly quantitative destruction of the chlorinated hydrocarbon with high chlorine and carbon mass balances. Selectivities to hydrochloric acid and carbon oxides can be co-optimized to approach near quantitative yield of both, which would result in the suppression of the formation of chlorine gas and/or higher chlorinated hydrocarbons. The presence of water insures that the formation of hydrochloric acid is favored over the formation of chlorine gas by shifting the equilibrium of the Deacon reaction to the right:

$$2\ Cl_2 + 2\ H_2O \rightleftharpoons 4\ HCl + O_2$$

FIGS. 1 to 6 describe a series of reactor runs using catalysts of Examples 4-6 and various volatile chlorinated hydrocarbon feeds including methylene chloride, carbon tetrachloride and tetrachloroethylene under varying conditions including variations in reaction temperature, and feed ratios. The feed ratio is the ratio of the number of carbon-chlorine bonds in the feed to the total number of carbon-chlorine bonds plus the total number of hydrogen atoms present in the feed mixture. In the case of methylene chloride the feed ratio is 0.5 (2 C-Cl bonds/(2 C-Cl bonds +2 hydrogen)). For carbon tetrachloride, the feed ratio is 1.0 and for tetrachloroethylene the feed ratio is 1.0. Feed ratios less than the feed ratio for the pure chlorinated hydrocarbon evidence the addition of water to the feed. The lower the feed ratio (number value), the more added water.

As evidenced in FIG. 1, using TCE as a feed, in all instances, the addition of an impregnating metal, CA in these examples, dramatically improved the amount of conversion. At 250° C., the conversion observed for the nonimpregnated monolithic analog was less than 10%. However, for the CA-impregnated counterparts, the minimum conversion was 25% and ranged as high as 60%.

Figure 2:
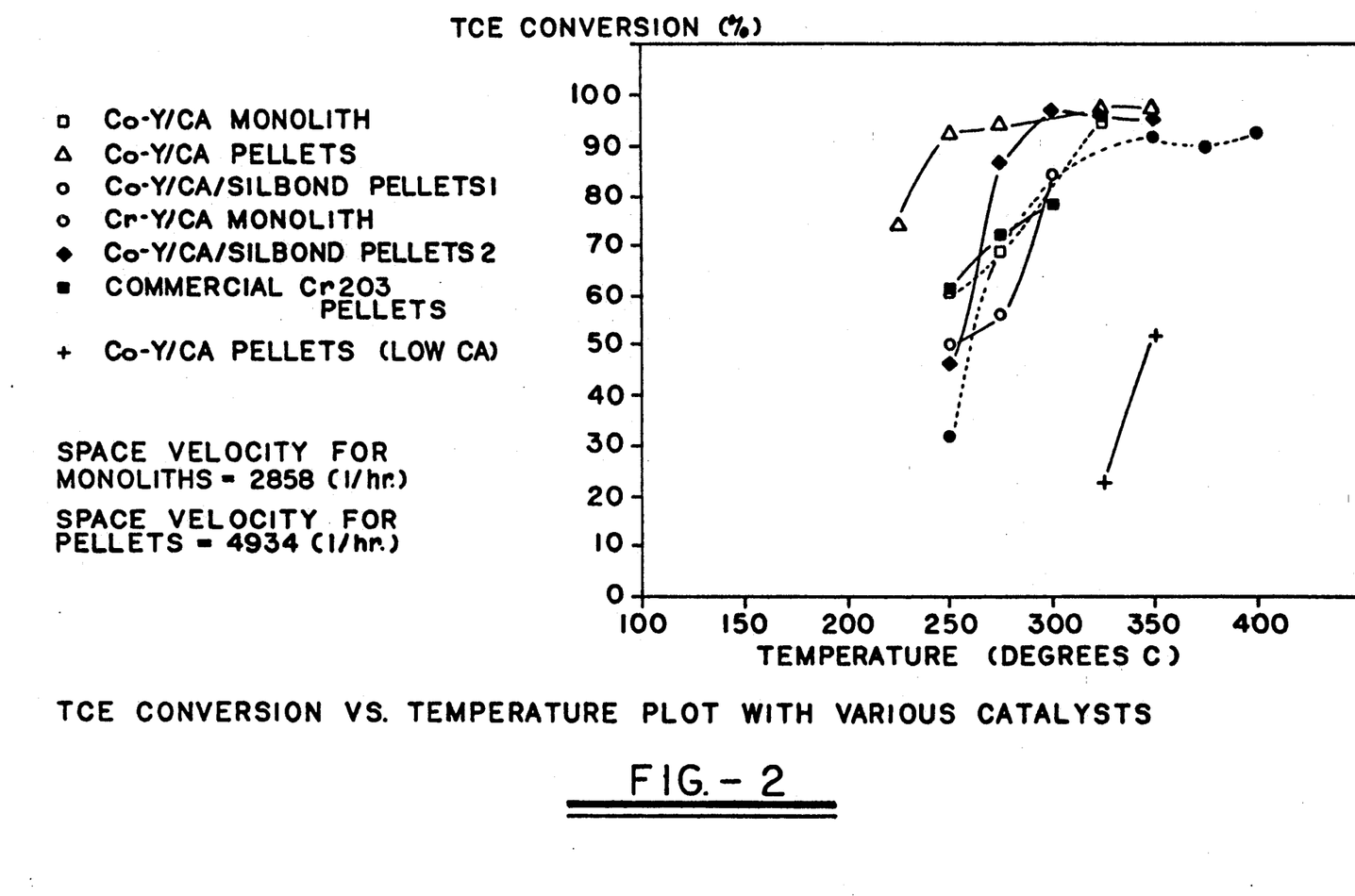
Figure 3:
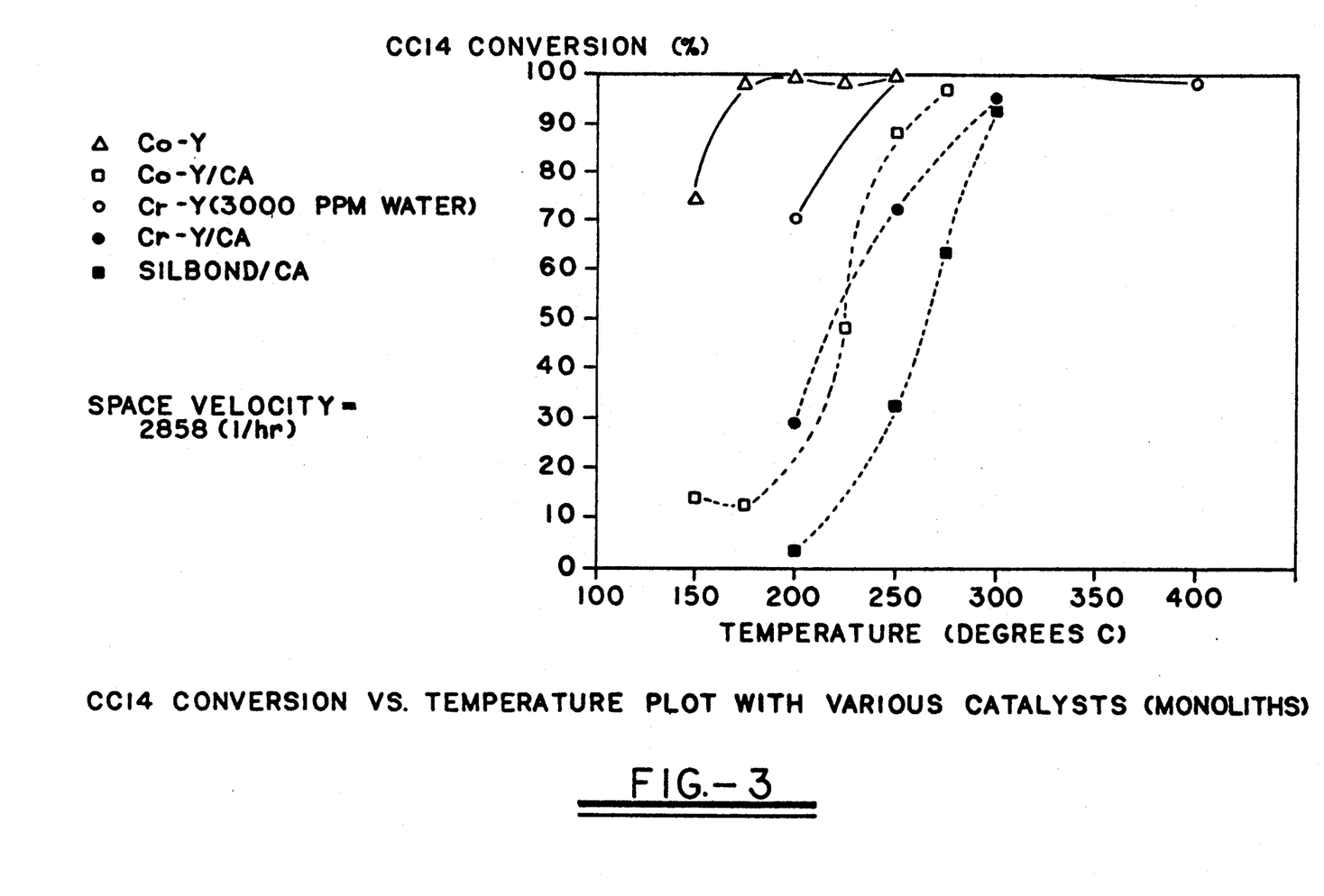
Figure 4:
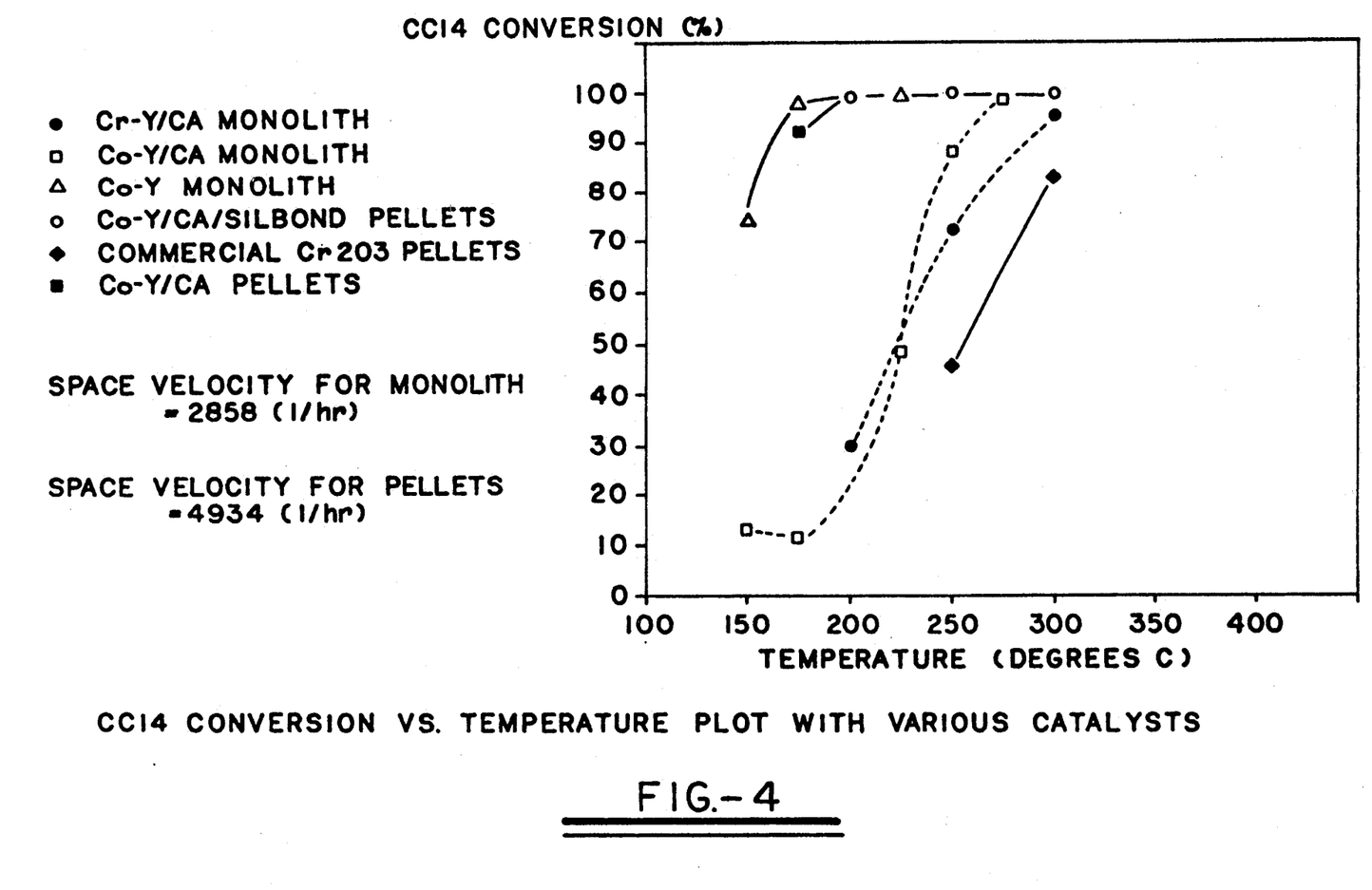
Figure 5:
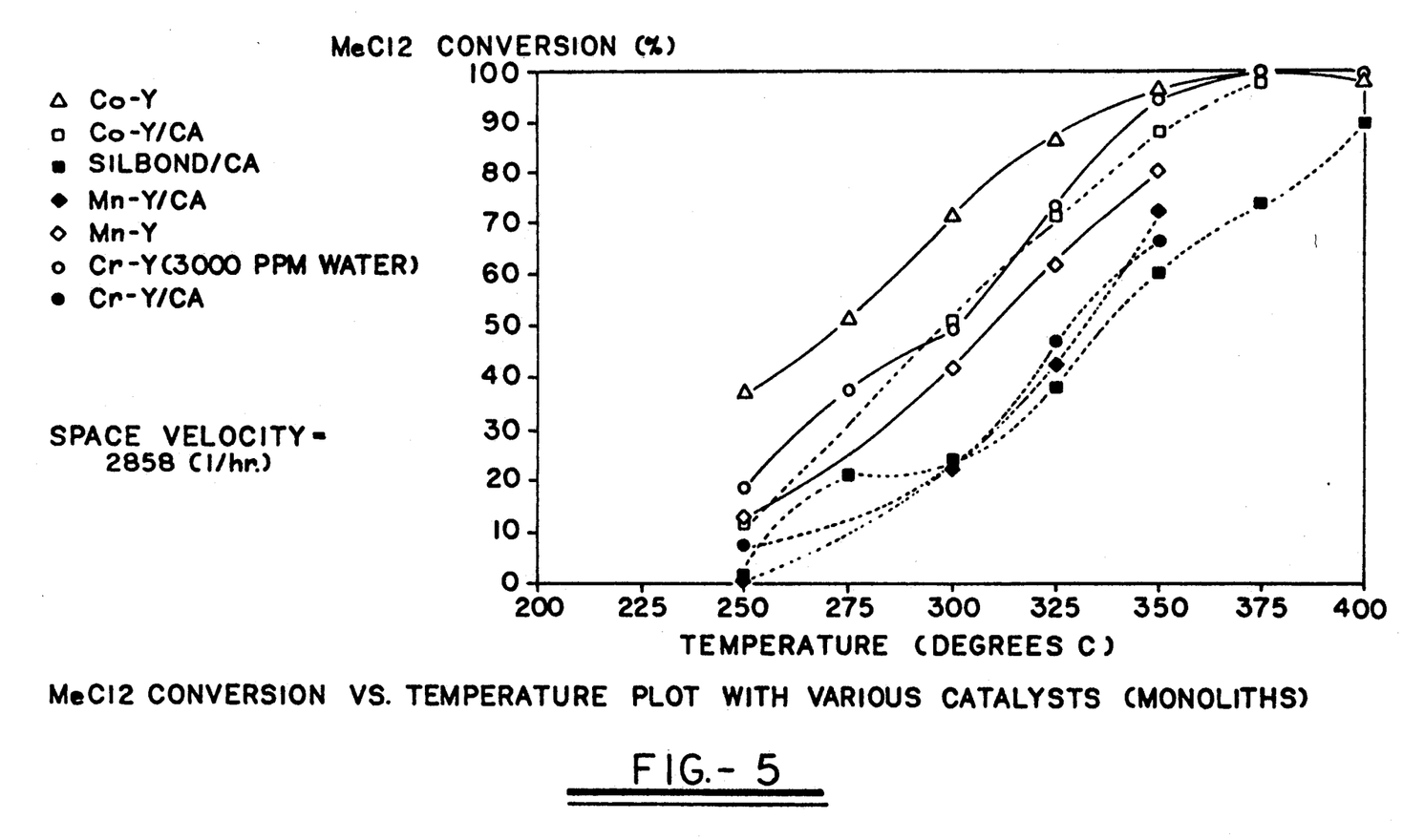
Figure 6:
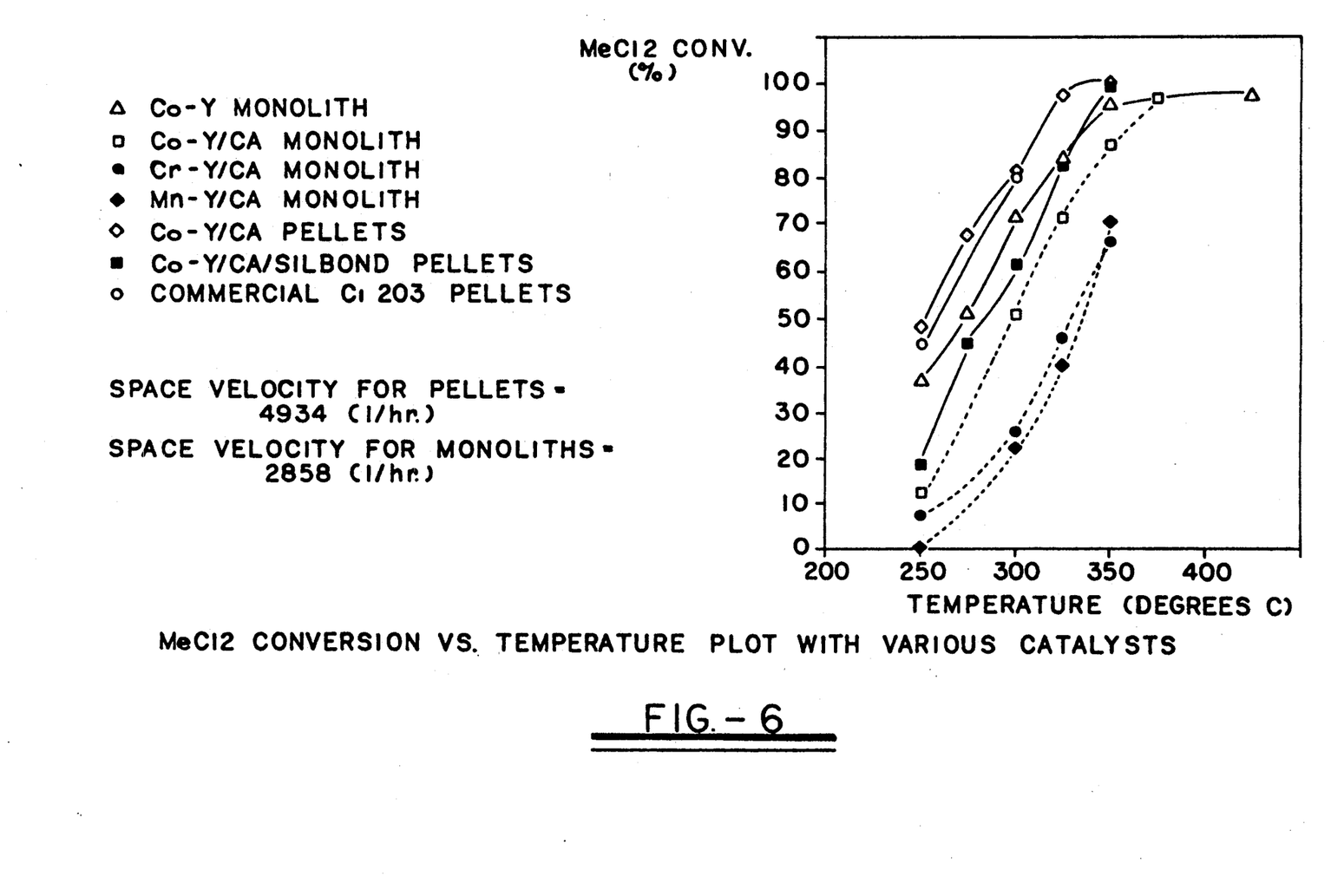

In FIG. 2, the ability of catalysts of the instant invention to oxidize chlorinated hydrocarbons in both pelletized and monolithic form is shown. It is noted that when the catalyst is comprised of Co-Y/CA pellets, exceptionally high oxidation conversion is experienced at temperatures between 200° C. and 250° C.

FIGS. 3, 4 and FIGS. 5, 6 provide comparable data using CCl4 and MeCl2 as the feedstocks. While the impregnated, exchanged zeolitic catalysts of the instant invention are not optimal for these feedstocks, it must be noted that chlorinated feeds do not typically occur in isolation. They almost universally occur as extremely complex mixtures of chlorinated moieties. These graphs do exhibit the fact that catalysts of the instant invention will work at low temperatures.

A large number of runs on various different types of catalysts based on the preparative procedures taught in Examples 1-6 are summarized in Tables 3a and 3b. Runs 1-9 impregnated, Cr-Y washcoated cordierite monolith catalyst; runs 10-18 use a CA-impregnated Cr-Y doubly washcoated cordierite monolith catalyst; runs 19-26 use a doubly-impregnated Cr-Y washcoated cordierite monolith catalyst; runs 27-35 use a CA doubly-impregnated, Cr-Y doubly-washcoated cordierite monolith catalyst; runs 36-40 use a Co-Y treated cordierite monolith catalyst; runs 41-44 use a CA-impregnated, Co-Y washcoated cordierite monolith catalyst; runs 45-49 use a Cu-Y washcoated cordierite monolith catalyst; and runs 50-53 use a CA-impregnated, Cu-Y washcoated cordierite monolith catalyst. The conversion and product distribution associated with these runs are given in Tables 3A and 3B.

TABLE 3A

| Run | Feed | Feed Conc. (ppm) | Water Conc. (ppm) | Temp (C.) | Conv. % | HCl | Cl2 |
|---|---|---|---|---|---|---|---|
| | | Cr-Y treated with CA | | | | | |
| 01 | MeCl2 | 1508 | 16589 | 250 | 7.9 | 25.6 | NA |
| 02 | MeCl2 | 1445 | 12500 | 300 | 25.3 | 49.2 | NA |
| 03 | MeCl2 | 1425 | 13317 | 325 | 46.1 | 44.2 | 0.9 |
| 04 | MeCl2 | 1234 | 19997 | 350 | 66.5 | 63.2 | 2.4 |
| 05 | CCl4 | 1012 | 11417 | 200 | 29.2 | 12.1 | 1.5 |
| 06 | CCl4 | 1077 | 16093 | 250 | 72.4 | 68.1 | 0.9 |
| 07 | CCl4 | 1137 | 13837 | 300 | 95.9 | 75.2 | 5.3 |
| 08 | TCE | 862 | 12949 | 300 | 84.8 | 70.0 | 1.5 |
| 09 | TCE | 882 | 12346 | 250 | 32.1 | 30.8 | NA |
| | | Cr-Y treated with CA with double loading of Cr-Y | | | | | |
| 10 | MeCl2 | 1304 | 6601 | 300 | 64.6 | 51.2 | 1.5 |
| 11 | MeCl2 | 1105 | 6697 | 325 | 83.2 | 83.4 | 5.4 |
| 12 | MeCl2 | 1247 | 6555 | 350 | 94.6 | 75.3 | 7.6 |
| 13 | CCl4 | 856 | 13186 | 200 | 44.5 | 49.9 | 0.3 |
| 14 | CCl4 | 860 | 10014 | 250 | 91.5 | 81.3 | 0.9 |
| 15 | CCl4 | 914 | 10165 | 300 | 95.1 | 81.7 | 5.2 |
| 16 | TCE | 904 | 9296 | 250 | 90.7 | 70.8 | 0.7 |
| 17 | TCE | 930 | 9895 | 275 | 85.1 | 60.0 | 1.1 |
| 18 | TCE | 975 | 9757 | 300 | 87.4 | 68.8 | 2.1 |
| | | Cr-Y treated with CA with double loading of CA | | | | | |
| 19 | MeCl2 | 1294 | 6200 | 250 | 12.2 | 28.6 | 0.4 |
| 20 | MeCl2 | 1348 | 6214 | 275 | 31.0 | 22.5 | 1.5 |
| 21 | MeCl2 | 1402 | 3611 | 300 | 51.1 | 35.3 | 2.9 |
| 22 | MeCl2 | 1258 | 6508 | 350 | 83.9 | 58.9 | 12.7 |
| 23 | CCl4 | 1252 | 4156 | 250 | 79.8 | 66.5 | 4.0 |
| 24 | CCl4 | 1102 | 14330 | 275 | 89.8 | 72.0 | 4.5 |
| 25 | TCE | 909 | 13549 | 250 | 53.6 | 47.5 | 0.4 |

TABLE 3A-continued

| Run | Feed | Feed Conc. (ppm) | Water Conc. (ppm) | Temp (C.) | Conv. % | HCl | $Cl_2$ |
|---|---|---|---|---|---|---|---|
| 26 | TCE | 944 | 11544 | 300 | 82.3 | 63.8 | 4.2 |

TABLE 3B

| Run | Feed | Feed Conc. (ppm) | Water Conc. (ppm) | Temp (C.) | Conv. % | HCl | $Cl_2$ |
|---|---|---|---|---|---|---|---|
| Cr-Y treated with CA with double loading of both CA and Cr-Y ||||||||
| 27 | $MeCl_2$ | 1059 | 8652 | 275 | 23.0 | 30.2 | 1.9 |
| 28 | $MeCl_2$ | 997 | 8907 | 300 | 57.5 | 44.7 | 5.0 |
| 29 | $MeCl_2$ | 969 | 7824 | 350 | 89.5 | 84.6 | 19.6 |
| 30 | $MeCl_2$ | 1193 | 13930 | 375 | 93.6 | 86.7 | 16.8 |
| 31 | $CCl_4$ | 1251 | 10452 | 250 | 77.6 | 55.7 | 0.8 |
| 32 | $CCl_4$ | 1248 | 7932 | 275 | 94.8 | 73.0 | 8.0 |
| 33 | TCE | 1001 | 20890 | 250 | 75.4 | 42.1 | NA |
| 34 | TCE | 979 | 18613 | 300 | 89.5 | 61.7 | 2.0 |
| 35 | TCE | 967 | 9157 | 325 | 94.7 | 6.1 | 13.8 |
| Co-Y alone (single loading) ||||||||
| 36 | $MeCl_2$ | 1051 | 16010 | 300 | 77.2 | 82.5 | NA |
| 37 | $MeCl_2$ | 824 | 14684 | 250 | 34.4 | 30.8 | NA |
| 38 | $MeCl_2$ | 722 | 19518 | 300 | 73.0 | 86.4 | NA |
| 39 | TCE | 761 | 10652 | 250 | 2.1 | 2.0 | NA |
| 40 | TCE | 903 | 20299 | 350 | 3.4 | 3.8 | NA |
| Co-Y treated with CA ||||||||
| 41 | $MeCl_2$ | 1273 | 13445 | 250 | 18.6 | 14.6 | NA |
| 42 | $MeCl_2$ | 1246 | 16076 | 350 | 91.0 | 88.3 | 7.2 |
| 43 | TCE | 775 | 13882 | 250 | 59.8 | 56.1 | NA |
| 44 | TCE | 655 | 18572 | 300 | 87.5 | 83.8 | 2.0 |
| Cu-Y alone (single loading) ||||||||
| 45 | $MeCl_2$ | 2087 | 19602 | 300 | 42.4 | 33.1 | NA |
| 46 | $MeCl_2$ | 1547 | 15644 | 350 | 73.8 | 74.2 | NA |
| 47 | $MeCl_2$ | 1829 | 12702 | 400 | 98.5 | 86.9 | NA |
| 48 | TCE | 1348 | 19320 | 250 | 15.3 | 4.1 | NA |
| 49 | TCE | 946 | 13897 | 300 | 13.3 | 3.1 | NA |
| Cu-Y treated with CA ||||||||
| 50 | $MeCl_2$ | 1960 | 16863 | 300 | 21.4 | 29.4 | NA |
| 51 | $MeCl_2$ | 2095 | 16876 | 350 | 58.5 | 60.9 | NA |
| 52 | TCE | 1297 | 21039 | 250 | 23.4 | 3.3 | NA |
| 53 | TCE | 1215 | 17008 | 300 | 70.3 | 52.5 | NA |

The data presented in Tables 3A and 3B, above, show that impregnation of a washcoated catalyst support containing either Cr-Y, Co-Y or Cu-Y with CA, greatly increases the activity of the catalysts. Comparing runs 1–9, 10–18, 19–26 and 27–35 impregnation of a CA and double treating with Cr-Y does improve catalytic performance. It is also apparent that impregnation is an extremely effective procedure for enhancing catalytic activity.

Comparing runs 36–40 with 41–44 also shows the substantial improvement that CA impregnation causes, particularly in the case with two-carbon moieties. This same effect is seen in the case of Cu-Y catalyst (runs 45–49 and 50–53).

Looking at the product distribution in Tables 3A and 3B, above, it is also apparent that CA causes increased formation of hydrochloric acid and a mixture of carbon monoxide and carbon dioxide.

It should be recognized that product distribution and conversion are completely controllable by changing temperature, residence time and water content as is apparent from the data reported in the tables.

Although the chlorinated organics used in Tables 3A and 3B were restricted to dichloromethane, carbon tetrachloride and TCE, any chlorinated organic, be it volatile or nonvolatile, can be oxidized in an analogous fashion, except that higher boiling chlorinated organics may have to be fed by entrainment or by higher inlet temperatures. Also, it should be recognized that when the halogenated organics contain fluorine, then alumina binders are preferred.

The ability of catalysts of this invention to oxidize fluorinated hydrocarbons using catalysts according to Examples 1–6, where the feed contains fluorinated hydrocarbons (CFC's) are summarized in Table 4. The catalyst was prepared as described in Examples 1–4 except that Silbond-H-5 TM was replaced with alumina. Table 4 has the run data associated with the catalytic destruction of CFC-11 and CFC-12.

TABLE 4

Cr-Y/CA Catalyst (25 wt % Loading)

| Run # | Feed | Feed Conc. | Temp (C.) | H-Source (ppm) | CONV % | Chlorine Balance | Carbon Balance |
|---|---|---|---|---|---|---|---|
| 54 | CFC-12 | 1319 | 425 | 1699 | 55.2 | 94.3 | 66.5 |
| 55 | CFC-12 | 1242 | 475 | 1915 | 92.4 | 46.5 | 45.7 |
| 56 | CFC-12 | 1059 | 400 | 1406 | 46.1 | 79.7 | 79.2 |
| 57 | CFC-12 | 1130 | 475 | 1909 | 91.5 | 40.0 | 56.6 |
| 58 | CFC-11 | 394 | 300 | 2215 | 66.0 | 103.1 | 90.0 |
| 59 | CFC-11 | 419 | 400 | 2094 | 99.4 | 96.1 | 53.1 |
| 60 | CFC-11 | 439 | 400 | 2094 | 99.2 | 91.9 | 49.5 |

H-source is Water for all runs

Runs 54–57 indicate that even a very stable CFC can be easily and readily destroyed using a catalyst according to Example 4 where the exchanging metal and the impregnating metal compound contain chromium as the active catalytic metal. At a temperature of 475° C. approximately 90–95% of CFC-12 is destroyed with high chlorine accountability and reasonably good carbon accountability.

Runs 58–60 show that the present catalyst oxidatively destroys CFC-11 at a lower temperature (400° C.) than CFC-12. This fact is due to the stability difference between CFC-12 and CFC-11. The conversion is nearly quantitative at 400° C. with good chlorine and carbon balance.

No fluorine analysis is available for these runs because fluorine is a very difficult element to detect and existing analytical techniques are still wanting.

While in accordance with the patent statutes the best mode and preferred embodiment of the invention have been described, it is to be understood that the invention is not limited thereto, but rather is to be measured by the scope and spirit of the appended claims.

What is claimed is:

1. A process for the destruction of halogenated organics comprising the steps of contacting a mixture of the halogenated organics with pure oxygen or an oxygen containing gas in the presence of a catalyst comprising a metal-exchanged, metal-impregnated aluminosilicate zeolite, wherein an exchanged metal in the metal-exchanged, metal-impregnated aluminosilcate zeolite is selected from the group consisting of V, Cr, Co, Ni, Cu, Fe, Mo, and Mn and an impregnated metal in the metal-exchanged, metal-impregnated aluminosilicate zeolite is selected from the group consisting of Ti, V, Cr, Mn, Fe, Co, Ni, Cu, No, Pd, and Pt, and further where the exchanged metal and the impregnated metal are different, and wherein the difference between the exchanged metal and the impregnated metal varies a temperature necessary to promote oxidation of the organics and for a contact time of about 0.2 to 1.0 seconds, sufficient to destroy the organics.

2. The process according to claim 1 wherein the time is from about 0.01 to 20 seconds and the temperature is from about 100° C. to about 650° C.

3. The process according to claim 2 wherein the time is from about 0.2 to 1.0 seconds and the temperature is from about 150° C. to about 450° C.

4. The process of claim 3, wherein the catalyst contains a support.

5. The process of claim 4, wherein the support is selected from the group consisting of alumina, aluminum oxide, silica, silicates, silica-aluminas, aluminum-silicates, titanias, and cordeirite.

6. The process of claim 5 wherein the support is a honeycomb support.

7. The process of claim 6 wherein the catalyst contains a binder.

8. The process of claim 7 wherein the binder is selected from the group consisting of alumina, silica, alumina-silica, cordierite, titania, zirconia, vanadia and other inorganic materials used as binding agents.

9. The process of claim 8 wherein the catalyst comprises from 5 wt. % to 46 wt. % of the binder, from 2 wt. % to 12 wt. % of the impregnated metal, and a remaining balance of the metal-exchanged aluminosilicate zeolite.

10. The process of claim 6 wherein the catalyst comprises from 2 wt. % to 12 wt. % of the impregnated metal, and a remaining balance of the metal-exchanged aluminosilicate zeolite.

* * * * *